United States Patent [19]

Leonard

[11] Patent Number: 5,264,670
[45] Date of Patent: Nov. 23, 1993

[54] SWITCH AND LIGHT ASSEMBLY

[75] Inventor: Stephen G. Leonard, Troy, Mich.

[73] Assignee: Aeroquip Corporation, Maumee, Ohio

[21] Appl. No.: 870,680

[22] Filed: Apr. 17, 1992

[51] Int. Cl.⁵ .............................................. H01H 3/16
[52] U.S. Cl. ................................ 200/61.62; 200/61.81
[58] Field of Search ............... 200/61.61, 61.62, 61.76, 200/61.78, 61.81, 61.82, 308, 310, 313, 314; 362/36, 64, 83.3, 95; 315/84

[56] References Cited

U.S. PATENT DOCUMENTS

| | | | |
|---|---|---|---|
| 2,228,456 | 1/1941 | Hobbs | 240/2 |
| 2,256,670 | 9/1941 | Greenlees | 240/2.13 |
| 2,271,910 | 2/1942 | Bleumle | 173/346 |
| 2,626,336 | 1/1953 | Chute | 200/159 |
| 2,646,477 | 7/1953 | Herterick | 200/51.13 |
| 2,791,677 | 5/1957 | Brown | 240/7.1 |
| 3,172,981 | 3/1965 | Loesch | 200/164 |
| 3,335,249 | 9/1966 | Smidt et al. | 200/167 |
| 3,553,448 | 1/1971 | Davis et al. | 240/7.1 |
| 4,115,723 | 9/1978 | Byrne et al. | 315/84 |
| 4,122,371 | 10/1978 | Talmage et al. | 315/84 |
| 4,513,183 | 4/1985 | Hill | 200/61.45 R |
| 4,807,098 | 2/1989 | Ahroni | 362/249 |
| 4,979,083 | 12/1990 | Takano et al. | 362/394 |
| 4,992,913 | 2/1991 | Buscella | 362/94 |
| 5,063,276 | 11/1991 | Woodard | 200/529 |

Primary Examiner—A. D. Pellinen
Assistant Examiner—Michael A. Friedhofer
Attorney, Agent, or Firm—Emch, Schaffer, Schaub & Porcello Co.

[57] ABSTRACT

A combined switch and light assembly having a socket body. The socket body has a mounting plate and a cylindrical body member. The assembly further includes a plunger consisting of a cylindrical tube. The plunger has a smaller diameter than the diameter of the body member of the socket body. The plunger is in sliding engagement with the body member of the socket body. A spiral spring is mounted in the socket body to slide the plunger with respect to the socket body. A metallic contact pin is attached to the plunger. A light bulb is mounted in the plunger and connected to the contact pin. A metallic plate is mounted on the socket body. The plate is connected to electrical leads. When the assembly is activated, the spring slides the plunger until the contact pin is in communication with the metallic plate. The electricity running to the plate flows to the contact pin connected to the light bulb. This energizes the light bulb to provide light.

10 Claims, 4 Drawing Sheets

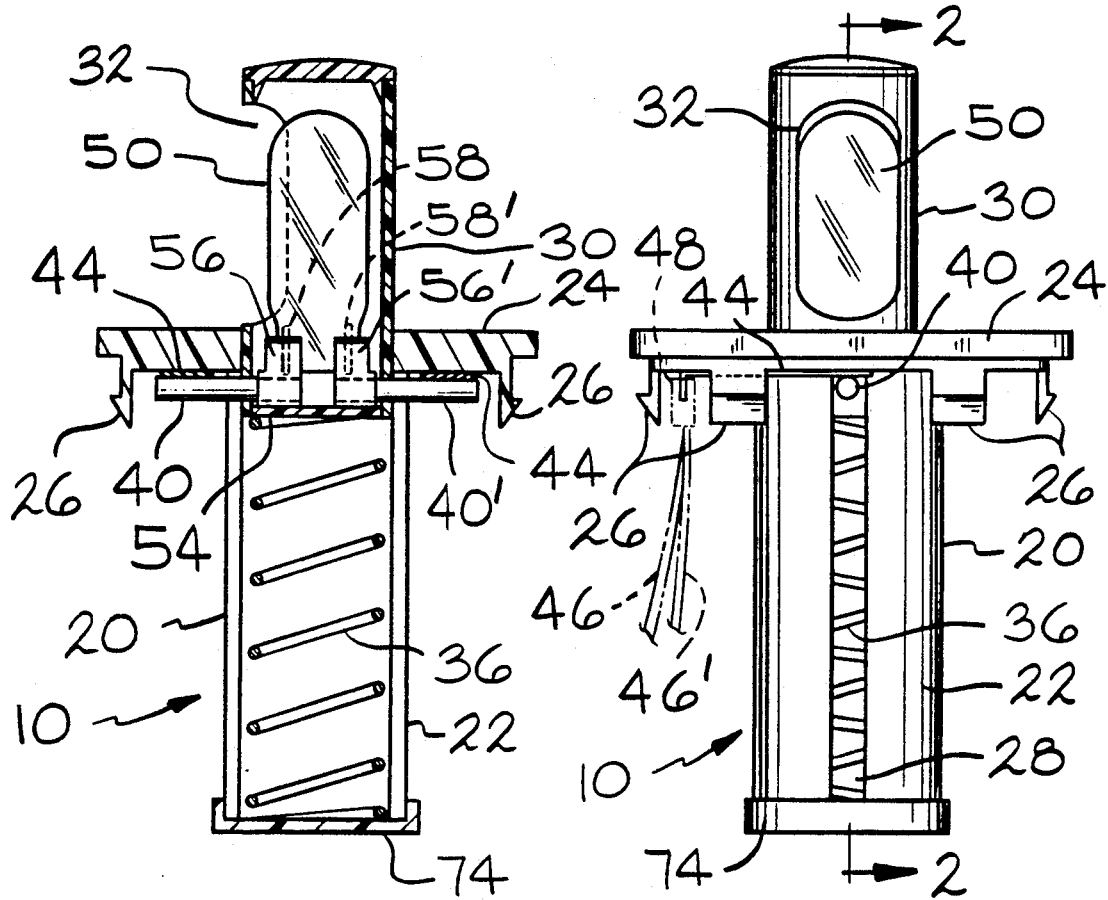
FIG. 2
FIG. 3
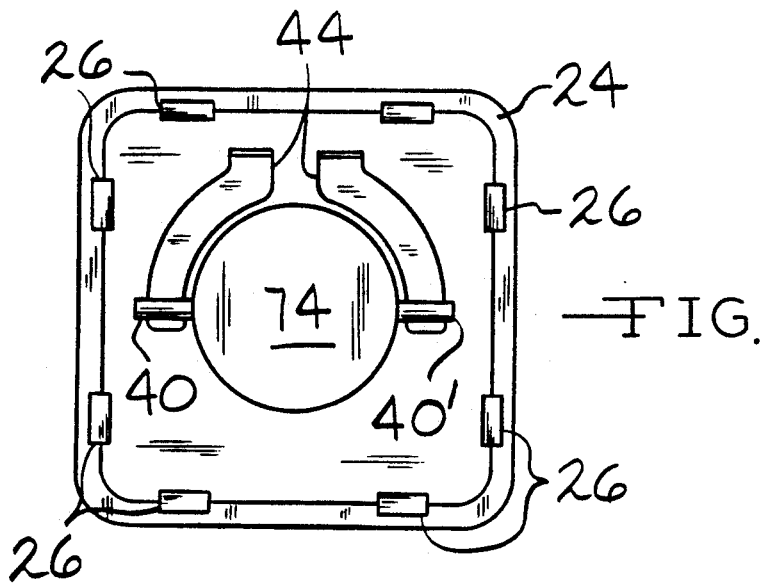
FIG. 4

SWITCH AND LIGHT ASSEMBLY

DESCRIPTION

1. Field of the Invention

The present invention is directed to a light assembly. More specifically, the invention is directed to a combined plunger switch and light assembly.

2. Background of the Invention

Combined switch and light assemblies are known in the art. For example, U.S. Pat. Nos. 2,228,456 (Hobbs); 2,271,910 (Bluemle); 2,646,477 (Herterick); and 2,791,677 (Brown) disclose various switch and light assemblies for use in glove compartments of automobiles. These prior art assemblies provide light for prior art compartments that are built integrally with a dashboard. The switch is activated when the compartment door is opened thereby energizing a bulb mounted in the compartment. The bulb directs light to the "back" of the compartment.

It has been found, however, that prior art switch and light assemblies do not provide the necessary light for modern glove compartments. In a modern compartment, the compartment is usually integral with the compartment door. Thus, when the door is opened, the compartment is moved along with the door away from the dashboard and into the interior of the automobile. Therefore, there is a need for a light that is placed over the compartment when it is opened. The present invention solves the above problem by providing a combined plunger switch and light assembly that provides the necessary light for modern glove compartments. The present invention is also relatively inexpensive and easy to manufacture as compared to prior art assemblies.

The switch and light assembly disclosed herein may also be used in conjunction with automotive trunk and engine compartments. It may also be used to provide light when the door of the passenger compartment of an automobile is opened. Further, the assembly may be used manually as a map light within the passenger compartment.

SUMMARY OF THE INVENTION

The present invention is directed to a combined switch and light assembly. The assembly includes a socket body. The socket body has a mounting plate and a cylindrical body member. The assembly further includes a plunger consisting of a cylindrical tube. The plunger has a smaller diameter than the diameter of the body member of the socket body. The plunger is in sliding engagement with the body member of the socket body. A spiral spring is mounted in the socket body to slide the plunger with respect to the socket body. A metallic contact pin is attached to the plunger. A light bulb is mounted in the plunger and connected to the contact pin. A metallic plate is mounted on the socket body. The plate is connected to electrical leads.

When the assembly is activated, the spring slides the plunger until the contact pin is in communication with the metallic plate. The electricity running to the plate flows to the contact pin connected to the light bulb. This energizes the light bulb to provide the necessary light to view the contents of the interior compartment.

It is the primary object of the present invention to provide a switch and light assembly that is efficient.

It is a major object of the present invention to provide a switch and light assembly that is simple and inexpensive to manufacture.

Other objects and advantages of the present invention will become apparent as the invention is described hereinafter in detail with reference being made to the accompanying drawings.

DESCRIPTION OF THE DRAWINGS

FIG. 2 is a cross-sectional view of the present invention taken along the line 2—2 of FIG. 3;

FIG. 3 is a side view of the present invention;

FIG. 4 is a bottom view of the present invention;

DESCRIPTION OF THE PREFERRED EMBODIMENTS

Figure 1:
FIG. 1 is a perspective view of a glove compartment of an automobile mounted in a dashboard showing the positioning of the present invention.

Referring now to the drawings, the preferred embodiments of the present invention are shown. As shown in FIG. 1, the switch and light assembly 10 is mounted in an automotive dashboard 12 over a glove compartment 14 having an integral compartment door 16. While the present invention is being described herein as being used in conjunction with a glove compartment, it will be appreciated by those skilled in the art that the present invention may be used for a variety of other applications including, for example, as a trunk light, an engine compartment light and a passenger compartment light.

Figure 7:
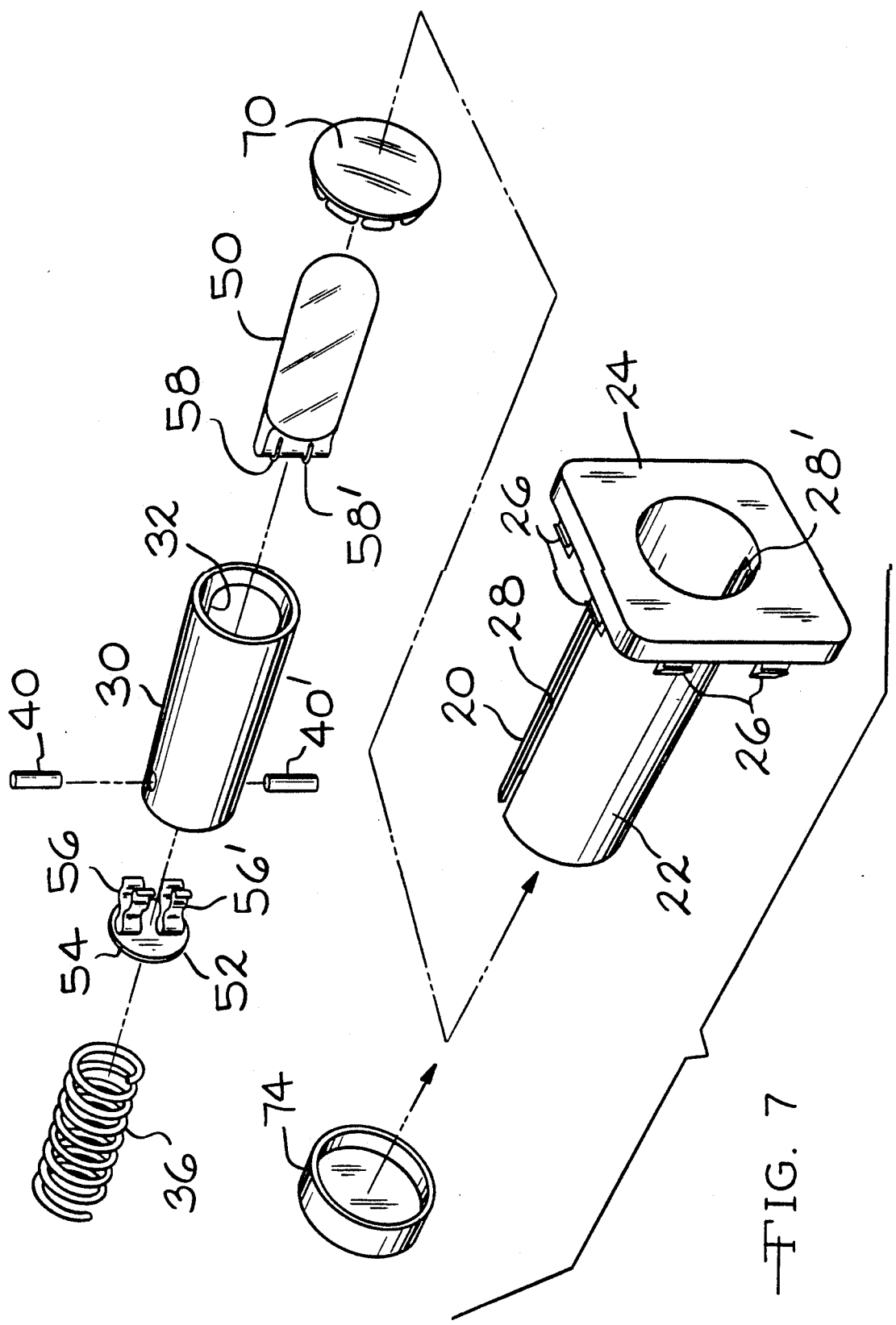
FIG. 7 is an exploded view of the present invention.

Referring to FIGS. 2, 3 and 7, the assembly 10 includes a socket body 20. The socket body 20 has an elongated body member 22. The socket body 20 further has a mounting plate 24 and a plurality of mounting clips 26. At least one contact pin receiving slot 28 is included on the body member 22. In the present embodiment, the slots 28 and 28' extend longitudinally with respect to the body member 22.

Referring still to FIGS. 2, 3 and 7, a plunger 30 is shown. The plunger 30 consists of an elongated cylindrical tube. The plunger 30 has a smaller diameter than the diameter of the body member 22 so that the plunger 30 can fit within the body member 22. The plunger 30 is in sliding engagement with the body member 22. The plunger 30 includes an opening 32.

As shown in FIGS. 2 and 3, a spiral spring 36 is mounted in the body member 22 adjacent to the plunger 30. The spring 36 slides the plunger 30 with respect to the socket body 20 when the glove compartment 14 is opened.

Referring to FIGS. 2, 3, 4 and 7, at least one metallic contact pin 40 is attached to the plunger 30. In the present embodiment, two contact pins 40 and 40' extend outwardly from the plunger 30. The contact pins 40 and 40' are received by contact pin receiving slots 28 and 28' in body member 22. The slots 28 and 28' act as guides to assure that the plunger 30 remains in proper alignment with the socket body 20.

As shown in FIGS. 3 and 4, a metallic contact plate 44 is mounted adjacent to the interior surface of the mounting plate 24 of socket body 20. The contact plate is connected to electrical leads 46 and 46'. The leads 46 and 46' are in communication with an energy supply such as the electrical system of an automobile (not shown). The leads 46 and 46' are attached to the contact plate 44 by a plug 48.

Referring to FIGS. 2, 3 and 7, a light source such as a light bulb 50 is mounted on the plunger 30. The bulb 50 is attached to the plunger 30 by a metallic clip 52 having a base 54 and squeeze members 56 and 56'. The squeeze members 56 and 56' engage contact pins 40 and 40' and the contacts 58 and 58' of the bulb 50.

Referring to FIG. 7, a plunger cap 70 can be removably attached to the top of the plunger 30 to provide access to the interior of the plunger to replace the bulb 50. A body socket end cap 74 can be attached to the body member 22 to close the body member 22 and also provide resistance for the spiral spring 36.

Figure 5:
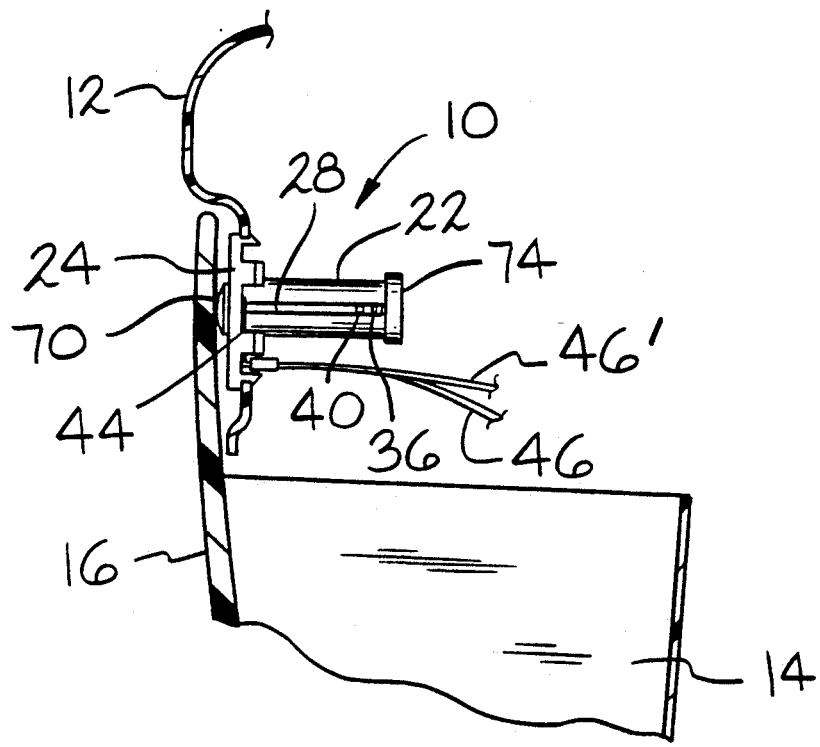
FIG. 5 is a side view showing the present invention mounted in a dashboard with the glove compartment closed.
Figure 6:
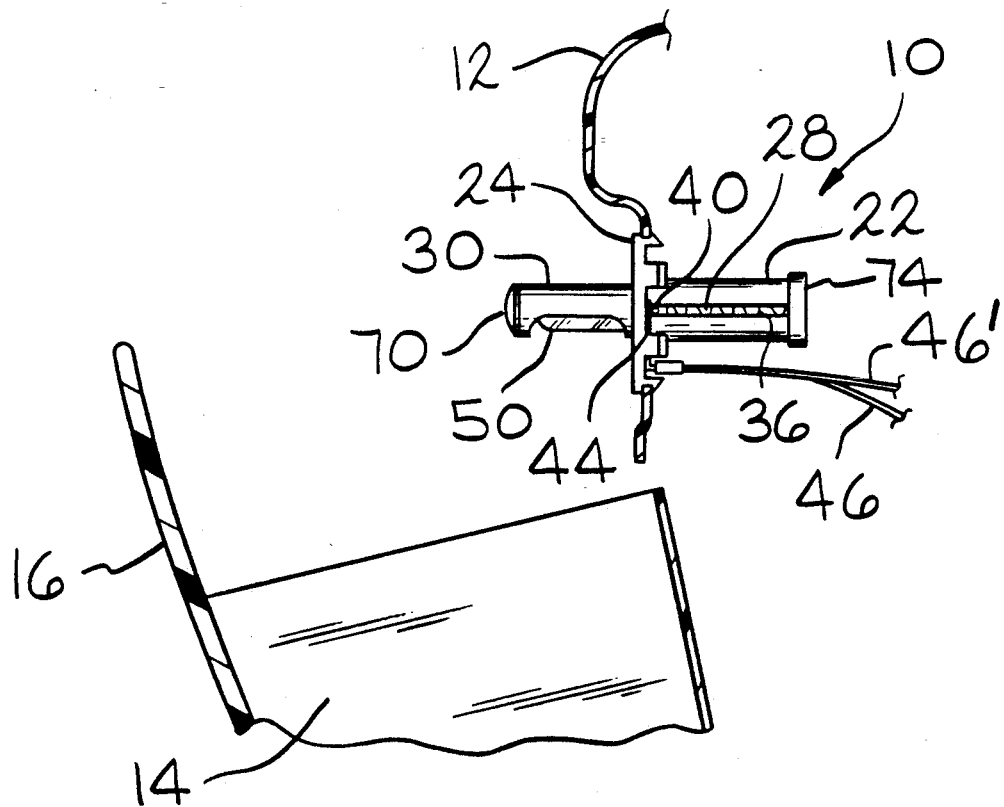
FIG. 6 is a view similar to FIG. 5 with the glove compartment open.

Referring to FIGS. 5 and 6, the assembly 10 is shown in a closed or "off" position (FIG. 5) or an open or "on" position (FIG. 6). When the door 16 of the glove compartment 14 is closed, the plunger 30 is contained within the body member 22. When the door 16 is opened, the spring 36 slides the plunger out of the body member until the contact pins 40 and 40' are in communication with the contact plate 44. This stops the forward progress of the plunger 30. It also completes an electrical circuit allowing electricity to flow from the leads 46 and 46' to the contact plate 44 to contact pins 40 and 40' and finally to the bulb contacts 58 and 58'. This causes the light bulb 50 to become energized and produce light. The light is directed into the compartment.

It should be understood that many changes can be made to the switch and light assembly disclosed in the drawings and still fall within the scope of the following claims.

I claim:

1. A switch and light assembly, comprising:
a socket body, said socket body having two contact pin receiving slots, a plunger, said plunger being in sliding engagement with said socket body, resilient elastic means for sliding said plunder with respect to said socket body, two plunger contact pins extending outwardly from said plunger, said contact pins being received by said contact pin receiving slots to maintain proper alignment of said plunger with respect to said socket body, a light means, said light means mounted on said plunger, said light means connected to said plunger contact pins, a contact surface means being in communication with an energy supply, whereby when said assembly is activated said resilient elastic means slides said plunger out of said socket body until said plunger contact pins are in communication with said contact surface means thereby energizing said light means.

2. The switch and light assembly of claim 1, wherein said socket body includes a mounting plate for mounting said socket body, said mounting plate including at least one mounting clip.

3. The switch and light assembly of claim 2, wherein said plunger is a cylindrical tube, said plunger having a smaller diameter than said body member of said socket body.

4. The switch and light assembly of claim 1, wherein said socket body includes a body member consisting of a cylindrical tube.

5. The switch and light assembly of claim 1, wherein said resilient elastic means is a spiral spring.

6. The switch and light assembly of claim 1, wherein said light means is a light bulb.

7. The switch and light assembly of claim 1, wherein said contact surface means is a metallic plate connected to electrical leads.

8. The switch and light assembly of claim 1, wherein said energy supply is an automobile electrical system.

9. A switch and light assembly, comprising:
a socket body, said socket body having two contact pin receiving slots, said socket body having a cylindrical body member, a plunger, said plunger being a cylindrical tube, said plunger having a smaller diameter than said body member of said socket body, said plunger being in sliding engagement with said body member of said socket body, a spiral spring for sliding said plunger with respect to said socket body, two metallic contact pins extending outwardly from said plunger, said contact pins being received by said contact pin receiving slots to maintain proper alignment of said plunger with respect to said socket body, a light bulb, said light bulb mounted on said plunger, said light bulb connected to said contact pins, a metallic plate connected to electrical leads, said leads being connected to an energy supply, whereby when said assembly is activated said spring slides said plunger out of said socket body until said contact pins are in communication with said metallic plate thereby energizing said light bulb.

10. A switch and light assembly, comprising:
a socket body having an elongated body member and a mounting plate, said body member having two contact pin receiving slots, a plunger consisting of an elongaged cylindrical tube, said plunger having a smaller diameter than the diameter of said body member, said plunger being in sliding engagement with said body member, a spiral spring mounted in said body member adjacent to said plunger for sliding said plunger with respect to said socket body, two metallic contact pins extending outwardly from said plunger, said contact pins being received by said contact pin receiving slots to maintain proper alignment of said plunger with respect to said socket body, a metallic contact plate mounted adjacent to the interior surface of said mounting plate, said plate being connected to electrical leads, said leads being connected to an energy supply, a light means, said light means mounted on said plunger, said light means being in communication with said contact pins, whereby when said assembly is activated said spring slides said plunger out of said socket body until said contact pins are in communication with said metallic contact plate thereby energizing said light means.

* * * * *